(No Model.)
W. R. WELKE.
TONGS.
No. 443,689.  Patented Dec. 30, 1890.
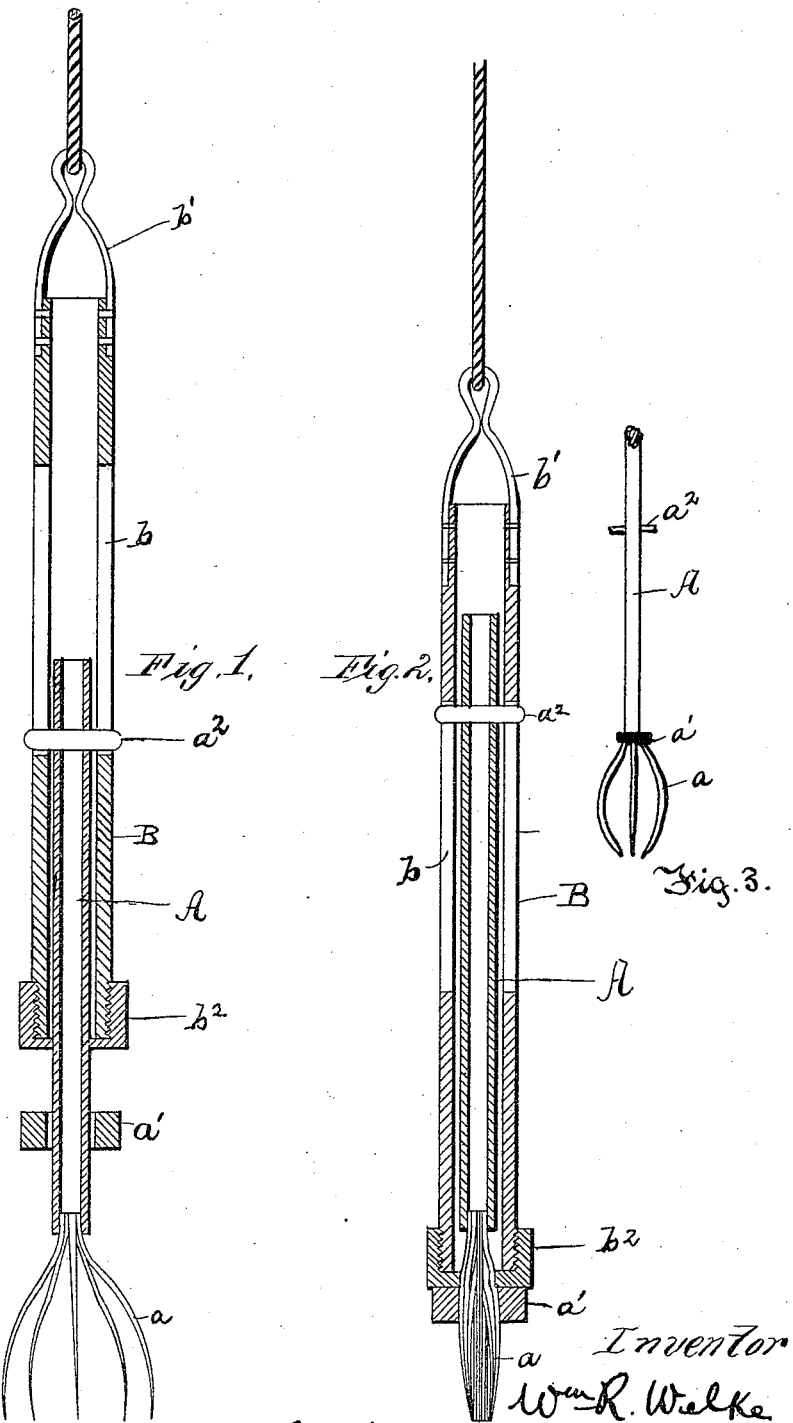
Witnesses
M. B. Harris
William Twombly
Inventor
Wm R. Welke
By Fitzgerald & Co
Attorneys

UNITED STATES PATENT OFFICE.

WILLIAM ROBERT WELKE, OF OAK CLIFF, ASSIGNOR OF ONE-HALF TO W. J. AND C. L. BETTERTON, OF DALLAS, TEXAS.

TONGS.

SPECIFICATION forming part of Letters Patent No. 443,689, dated December 30, 1890.

Application filed May 20, 1890. Serial No. 352,557. (No model.)

*To all whom it may concern:*

Be it known that I, WILLIAM ROBERT WELKE, a citizen of the United States, residing at Oak Cliff, in the county of Dallas and State of Texas, have invented certain new and useful Improvements in Tongs; and I do hereby declare the following to be a full, clear, and exact description of the invention, such as will enable others skilled in the art to which it appertains to make and use the same.

My invention relates to grappling-tongs; and it consists, essentially, of a solid or tubular shank provided with spring-metal tines, a ring to slide thereon, and a hollow weight sliding on the tube adapted to drive the ring down upon the tines, all as hereinafter fully described, illustrated in the drawings, and specifically pointed out in the claims.

Referring to the accompanying drawings, wherein the same indicating-letters point out the same parts in all the figures, Figure 1 is a vertical section of my improved tongs, showing the tongs open. Fig. 2 is a similar section, with the tines closed. Fig. 3 is a view of parts of the tongs, showing a solid shank carrying the tines.

In the drawings, A is the shank, which may be either solid, as shown in Fig. 3, or formed of pipe, as shown in Figs. 1 and 2. Attached to the foot of the shank A, by dovetailing, screws, or other suitable means, is a radial series of spring-metal tines $a$. Sliding freely upon the lower part of the shank A is a ring $a'$, and the joint between the shank and the tines is made smooth in order that this ring may pass easily upon the tines.

Fitted to the shank A, and adapted to reciprocate freely thereon, is a weighted sleeve B. In its sides are cut longitudinal slots $b$. From the sides of the shank A project the opposite ends of a pin $a^2$, and this pin has play within the slots $b$, and thus obviously limits the length of the stroke of the sleeve B. Thus the connections are established, and in order to attach the operating line or rod to the whole tool so completed a bail or other fastening device $b'$ is affixed to the upper end of the sleeve B. At the lower end of the said sleeve a cap or striker $b^2$ is secured, which may be heavy to lend additional weight to the sleeve.

My invention thus described may be used in any situation where vertical grappling-irons are necessary, and it is especially adapted for the recovery of tools, broken sections, stones, or débris from artesian-well borings. Its operation is as follows: The whole tool is lowered rapidly, and the instant the tines reach the bottom or the object to be grasped the shank and tines stop; but the sleeve has acquired momentum and continues to move downward, thereby bringing the striker $b^2$ in contact with the ring $a'$, giving it a smart blow and by forcing it downwardly closes the tines, which grasp the object, as desired. If it is found upon slightly pulling the operating line or rod that a sufficiently firm grasp has not been taken, the sleeve B may be raised to the limit allowed by the slots and pin and the blow repeated, and again *ad libitum*. This feature of repeated blows to acquire a firm grasp constitutes a point of superiority over those devices which use springs, wherein the strength of grasp is necessarily limited by the retractive strength of the spring in each case.

Having now described my invention, what I claim, and desire to secure by Letters Patent of the United States, is—

1. In grappling-tongs, a shank having terminal curved spring-metal tines, and a sliding ring adapted to pass over and compress said tines, in combination with a weighted sleeve limited in stroke by slot and pin encircling the shank and adapted to descend, strike, and force down the sliding ring in order that it may encircle and compress the tines, as and for the purpose intended, substantially as described.

2. In grappling-tongs, the shank A, tines $a$, ring $a'$, pin $a^2$, sleeve B, slotted at $b$, bail $b'$, and striking-cap $b^2$, all in combination, as and for the purpose intended, substantially as described.

In testimony whereof I affix my signature in presence of two witnesses.

WILLIAM ROBERT WELKE.

Witnesses:
R. LEUTZ,
M. LEUTZ.